Feb. 5, 1946.  J. O. DE CHAPPEDELAINE  2,394,513
FLOW CONTROLLED HELICOPTER
Filed Aug. 15, 1944  2 Sheets-Sheet 1
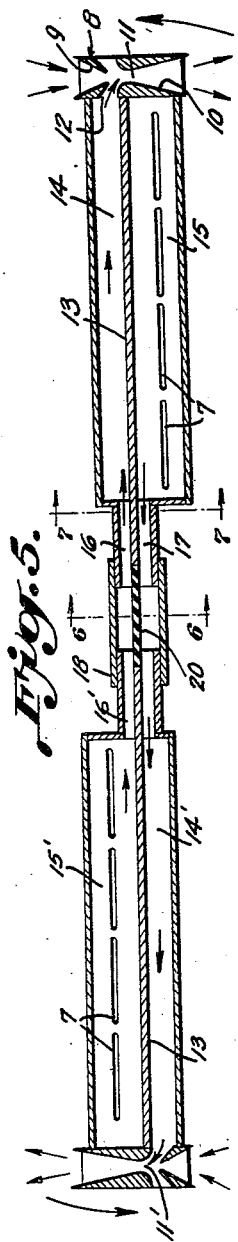
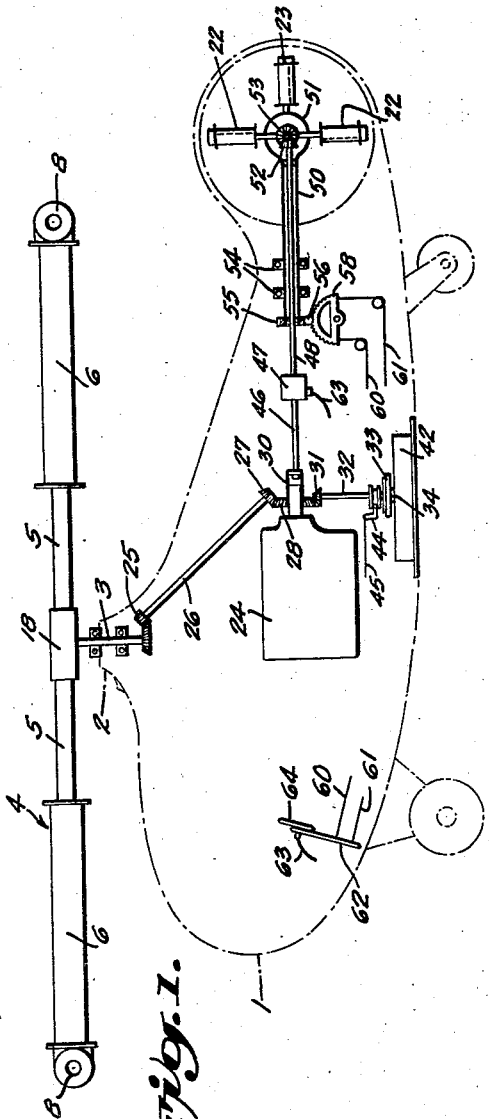
Inventor
J. O. DE CHAPPEDELAINE
By
Attorneys Feb. 5, 1946.   J. O. DE CHAPPEDELAINE   2,394,513
FLOW CONTROLLED HELICOPTER
Filed Aug. 15, 1944   2 Sheets—Sheet 2
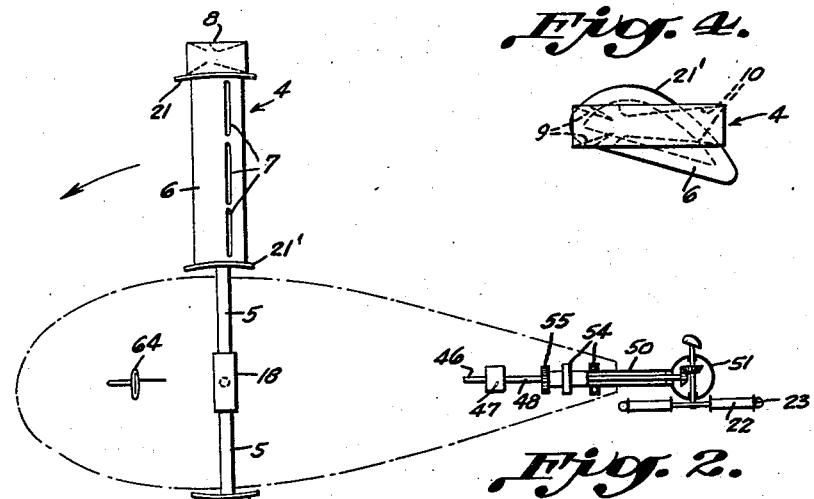
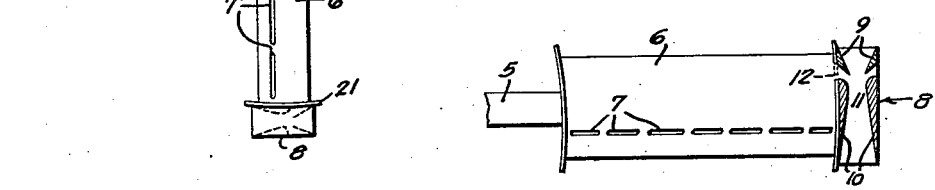
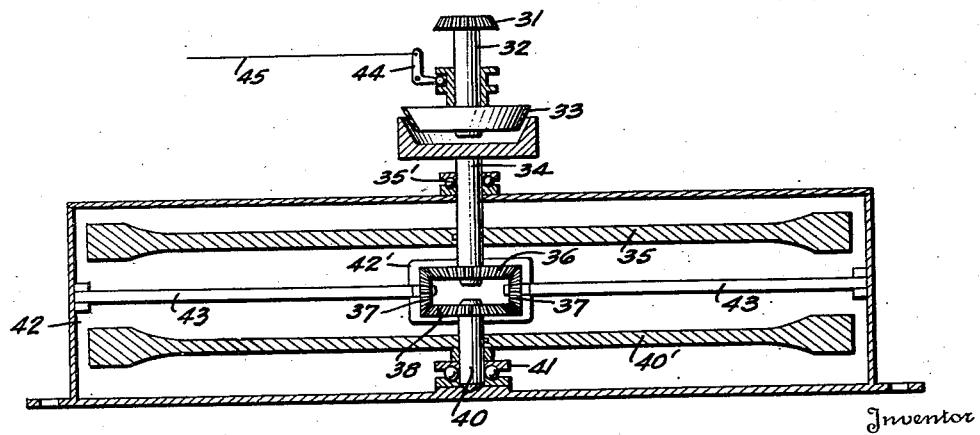
Inventor
J. O. DE CHAPPEDELAINE Patented Feb. 5, 1946

2,394,513

UNITED STATES PATENT OFFICE 2,394,513

FLOW CONTROLLED HELICOPTER

Jean Olivier de Chappedelaine, Reading, Pa.

Application August 15, 1944, Serial No. 549,584

4 Claims. (Cl. 244—17)

This application is a continuation in part of my prior application, Serial Number 469,058, filed December 15, 1942, for Flow controlled helicopter.

This invention relates to helicopters, and particularly to that type able to rise vertically, to hover, and to fly in any direction desired.

In order that a clearer perception of the present invention may be had and the objects sought, the present type of direct lift aircraft has many advantages with respect to existing helicopters now in use. By using a special boundary flow controlled lifting rotor there is obtained a much more efficient design than the standard airscrew propeller, and consequently the load lifted per horsepower is relatively greater and therefore the engine required to maneuver the aircraft may be relatively smaller. The lifting rotor is of less diameter and the entire machine may accordingly be built smaller and lighter than heretofor.

The control and operation of the aircraft is simple and powerful and obtained at least by one engine driven tail auxiliary rotor rotating in a vertical plane through the longitudinal center line of the fuselage, the support of which ends in a hollow shaft which may be swiveled in such a manner that the thrust produced by the auxiliary rotor can be directed, at the will of the pilot and in the direction required to perform the desired maneuver.

By means of a variable speed transmission the pilot can also trim the speed of the auxiliary rotor. This device enables the pilot to control the helicopter effectually and permits compensation of the torque produced by the main lifting rotor. In tilting the fuselage forwardly by trimming the position and the velocity of the auxiliary rotors, the thrust of the lifting rotor may be divided into two components, one vertical used to control the machine in a vertical plane, and the other horizontal acting as a lateral propeller thrust to determine direction.

In case of engine failure, a safe and slow vertical landing is secured by means of a flywheel unit composed of preferably two flywheels rotating in opposite direction, thus eliminating the gyroscopic effect. This flywheel unit is normally driven by the engine but can be disconnected from it by means of a suitable clutch operated by the pilot. A free wheeling device is provided on the shaft of the engine in order to permit the gears and shafts, normally driven by the engine, to keep rotating should the engine stop unexpectedly, thereby to keep the main rotor turning and materially decrease the rate of drop.

The lifting rotor of the helicopter is also provided with a suitable pitch control device enabling the pilot to change the angle of attack of the rotor blades from the maximum positive pitch to a suitable negative pitch.

Thus in case of engine failure, two situations are to be considered:

First, if the helicopter is flying at high altitude, the pilot disconnects flywheel from the transmission in actuating the clutch and then reverses the rotor pitch in order to utilize the windmill effect of the rotor to slow down the helicopter. The disengagement of the clutch and the reversal of the rotor pitch are preferably controlled by the same actuator which is designed to operate the clutch only when the pitch of the rotor blades begins to become negative. When the helicopter is relatively near the ground, the pilot engages the clutch and in the meantime again puts the rotor blades in a positive pitch.

The flywheel unit in which a great quantity of kinetic energy is stored, will drive the lifting rotor and the auxiliary rotors and the landing can be made as slowly as desired because the pilot is able in adjusting the rotor pitch to produce a suitable lift and to regulate the rate of descent of the helicopter. Second, in case of engine failure at low altitude, the pilot is not obliged to disengage the flywheel clutch nor to reverse the rotor blade pitch because the kinetic energy stored in the flywheel unit is sufficient to drive the lifting rotor with the blades set at positive pitch. The pilot has only to adjust the positive pitch in order to control the rate of descent of the helicopter.

Accordingly, one of the primary objects of this invention is to provide a reliable and efficient helicopter of improved design, characterized by simplicity, safety, and reliability in operation.

A further object is the provision of such a practical device embodying novel and improved control mechanism including an auxiliary power source adapted to function in the event of engine failure.

Other objects will be in part obvious from the annexed drawings and in part hereinafter indicated in connection therewith by the following analysis of this invention.

This invention accordingly consists in the features of construction, combination of parts, and in the unique relation of the members and in the relative proportioning and disposition thereof, all as more completely outlined herein.

To enable others skilled in the art fully to comprehend the underlying features of this invention, that they may embody the same by the numerous modifications in structure and relation contemplated by the invention, drawings depicting the preferred embodiments of the invention form a part of this disclosure, and in such drawings like characters of reference denote corresponding parts throughout the several views in which—

Fig. 1 is a side elevational and semi-diagrammatic view of a helicopter showing the lifting rotor, at least one of the auxiliary rotors and the general arrangement of parts inside the fuselage, which latter is shown in dotted lines for the sake of clearness.

Fig. 2 is a similar view in plan with the rotors shown in one position.

Fig. 3 is a plan view of a rotor blade showing the slots located on the upper surface of the blade and one of the ejector device of the Venturi type shown in section.

Fig. 4 is a side view of the tip of one blade showing the position of the ejector or venturi with regard to the airfoil section of the blade.

Fig. 5 shows both blades of the main rotor in section with inversions of the Venturi action as shown in Fig. 2.

Fig. 6 is an enlarged cross section of the hub on line 6—6 of Fig. 5 showing the tube joining the spars which run inside the hollow arms and hollow blades of the rotor.

Fig. 7 is a section substantially along line 7—7 of Fig. 5 showing the hollow tube attached to the respective blades and the section of the two channels through which the air flows, and Fig. 8 is a detail sectional elevational view of the safety flywheel unit.

Referring to the drawings illustrating one example of the flow controlled helicopter, it is to be understood that various modifications may be made without changing the fundamental principle of the invention.

The flow controlled helicopter is composed of a streamlined fuselage 1 on the top of which is mounted a pylon 2 supporting a vertical shaft 3 driving at its upper end a main lifting rotor 4. The lifting rotor which is one of the main features of the present invention, is composed of hollow arms or tubes 5 supporting at the ends hollow blades 6 of airfoil shape. Each blade is provided on its upper surface with a series of holes or slots 7, Fig. 2, and fitted at the tip with an ejector device 8 of the Venturi type. This ejector device is composed of a cylinder having its axis perpendicular to the radius of the rotor shaft 3. In these cylinders are fitted convergent intake channels 9 and divergent outlet channels 10, Fig. 3. The throat 11 of the convergent-divergent channel assembly is connected with the inside of the blades by means of opening 12.

When the lifting rotor 4 is rotated, the ram or high pressure produced in this ejector 8 forces the air to pass through the convergent-divergent or Venturi assembly. A strong negative pressure is produced in the throat 11 and the boundary layer flowing at the upper surface of the blades 6 is removed by suction through the slots 7 (Fig. 2) to the inside of the blades 6 and thence to opening 12 and is finally ejected by the divergent part 10 of the venturis.

In the case of a helicopter designed for high forward speed, it is useful to compensate the asymmetrical action of the air on advancing and retreating sides of the lifting rotor. This result may be attained by inverting the suction produced by the ejectors. For that purpose the throat of each ejector attached to the tip of each blade is connected with a pipe passing through this blade, the hollow arm supporting this blade and the hub of the rotor to the opposite arm and ends inside the opposite blade as shown in Fig. 5. By this means the highest suction produced by the advancing ejector is applied to the slots of the retreating blade and the smallest suction produced by the retreating ejector is applied to the slots of the advancing blade. As the lift produced by sucking away the boundary layer is proportional to the suction volume, a compensating effect is obtained by this means.

The equalization of the lift is produced automatically, constantly and directly by the arrangement and the connection of the venturis. No valves or auxiliary means are necessary to obtain this result other than a simple partition 13 dividing the hollow blades, the interior of the arms 5 and hub in two parts, each connected with the respective venturis as shown in Fig. 5.

This may be attained as follows: The spar partition 13 shown in detail Fig. 5 runs inside the right blade 6 and divides this blade in two channels 14 and 15 of which channel 14 is connected to the throat 11 of the right venturi. The spar 13 supporting the right blade 6 is attached inside the right hollow arm 5 and divides this arm in two channels 16 and 17 connected respectively with channels 14 and 15.

The arrangement of the left blade of the rotor is symmetrical with regard to the axis 3 of rotation. The left blade 6 is divided in two channels 14' and 15' by a continuation of the same partition 13. The channel 14' is connected to the throat 11' of the left venturi. The partition 13 supports the blade 6 and is attached inside the hollow left arm 5 and divides this arm in two channels connected respectively with the channels 16 and 17 at the right of the axis as clearly shown in Fig. 5. The two arms are inserted inside the hub 18 as shown in Fig. 5. The parts 13 and 14 do not meet each other inside the hub but a space is provided between their ends. A flexible partition 20 is attached to the part 13 and to the corresponding part in order to fill the remaining space and to divide the hub 18 in two parts which are connected respectively to the channels in the blades. The partition 20 may be made of any suitable flexible material in order to allow some angular motion of the parts 13—13 with respect to each other.

This partition 20 is desirable when blades with automatic or controlled feathering devices are used. For instance in case of engine failure the automatic rotation of the lifting rotor 6 to slow down the descent of the helicopter requires the reversal of the pitch of the blades in order to keep the rotor always rotating in the same direction. During the reciprocal and angular motion of the parts 13 the flexible partition 20 can take the needed warping (see Fig. 6) and constantly divides the inside of the hub in two channels shown.

Fig. 7 shows how one arm is attached to its blade 6 in order to connect the respective channels together. For this purpose a flange 21 (Fig. 2) is attached to the end of the arm 5 and to its blade 6 forming end plates for the hollow blade and providing two passages corresponding to the channels 14 and 15. A similar device is used to attach the opposite arm to its blade (Fig. 5). When the rotor is rotating in the direction indicated by the curved arrows, Fig. 2 and Fig. 5, the air entering the right venturi produces a suction in the throat 11 and the boundary layer flowing on the upper surface of the left blade 6 is sucked away through the slots 7 and flows inside the blade into the channel 15', and inside the other arm in the channel 16', thence to the channel inside the hub 18 and in the channel 16 of the right arm, then in the channel 14 of the right blade, and finally enters in the throat of the right venturi through the opening 12. The left venturi will have a similar and reverse action and will force the air to flow through the slots inside the blade into the channel 15, the corresponding channels inside the blades and finally out through the opening in the throat of the left venturi, all as clearly shown by arrows in Fig. 5.

With such a device, using thick airfoil section, a very high lift coefficient and low drag coefficient can be obtained. The ratio of lift over drag is very great and relatively little power is required to fly the aircraft. Furthermore, because of the high lift coefficient obtained with the boundary layer suction, the size of the blades is also small and the diameter of the lifting rotor can be reduced considerably. To prevent marginal aerodynamic losses, end plates 21 and 21' concentric to the rotor axis are provided at the end of each blade, Fig. 2.

The same remarks apply to the auxiliary rotor shown in Figs. 1 and 2 at the right. To obtain the best result with the boundary layer it is removed in a similar manner and the blades 22 are preferably fitted with end plates 23 (Fig. 2) concentric to the axis of rotation of the rotor in order to offer the least drag possible.

The shaft 3 is driven by the engine 24 by means of any suitable transmission composed for instance, of bevel gear 25, shaft 26 and pinion 27. The pinion 27 engages the gear 28 which is provided with a suitable free wheeling device 30 mounted on the engine shaft. This arrangement enables the gear 28 to continue to rotate when the engine stops unexpectedly. The gear 28 also drives a pinion 31 mounted on a shaft 32 connected to a clutch 33 which is able, when engaged, to drive a shaft 34 on which is mounted a flywheel 35. The shaft 34 is supported by bearings 35' and is provided at its lower end with a gear 36 in mesh with a suitable number of idle pinions 37 driving the gear 38 mounted on a shaft 40 on which is mounted a flywheel 40' identrical to the flywheel 35. Because of this gear arrangement, the flywheel 40' will rotate in the opposite direction than the flywheel 35 but at the same speed and the gyroscopic forces are balanced.

The lower end of the shaft 40 is supported by a thrust bearing 41 attached to the bottom of a housing 42 enclosing the two flywheels. The gears and the idle pinions are enclosed in a casing 42' supported by brackets 43 attached to the sides of the housing 42, the bottom of which is attached to the floor of the fuselage.

The clutch actuator 44 is operated by a control wire 45 ending in the cockpit and attached to a suitable actuating lever, not shown, near the pilot. As recommended above, the actuating lever may also operate the lifting rotor blade pitch reversal device in the usual well known manner for that part alone.

The gear 28 is fitted with an extension shaft 46 which appears as an extension of the engine shaft 46 but turns with the gear 28. This shaft 46 is connected at the other end with a variable speed gear box 47 driving shaft 48 passing through a hollow shaft 50. The shaft 50 is located at the tail of the aircraft and carries at one end a gear box 51. The shaft 48 by means of a bevel gear 52 drives a vertical shaft 53 crossing the gear box 51 so that it is perpendicular to the vertical plane containing the center line of the fuselage. On the ends of the shaft 53 are mounted auxiliary rotors 22 which are relatively small but provided with boundary layer and Venturi suction devices just as the lifting rotor and built in the same manner only much smaller. The auxiliary rotors 22 are designed so that the thrust produced when rotating can be used to compensate for the torque of the lifting rotor when driven by the engine.

The hollow shaft 50 carrying the gear box 51 and the auxiliary rotors are attached to the end of the fuselage by suitable bearings 54 and are fitted at their ends, toward the inside of the fuselage, with pinions 55 which can be driven by means of a suitable gear and worm gear assembly 56 actuated by a cogged sector 58 and finally by the control cables 60 and 61 connected with a control stick 62 which swivels around the usual pivot. By moving the control stick 62 forwards or backwards the pilot is able to force the hollow shaft 50 to swivel so that the auxiliary rotors 22 may be tilted toward the right or toward the left.

The variable speed gear box 47 is operated by a flexible shaft 63 connected with the control wheel 64 on the control stick. By rotating the control wheel clockwise for instance, the pilot can increase the speed of rotation of the auxiliary rotor and by turning the control wheel counterclockwise, the pilot can decrease the R. P. M. of the auxiliary rotors with regard to the R. P. M. of the lifting rotor. These simple devices permit efficient control of the helicopter.

In operation let it be assumed that the flow controlled helicopter is at rest on the ground, and when in this position the axis of the lifting rotor is substantially vertical and the axis of the auxiliary rotor is horizontal and perpendicular to the center line of the fuselage. Upon starting the engine, the main lifting rotor 4, the flywheels and the auxiliary rotors are driven progressively. The number of R. P. M. of the auxiliary rotors is such that the thrust produced compensates exactly the torque of the lifting rotor. When the speed of rotation of the lifting rotor is high enough, the aircraft is lifted in the air vertically. To fly forward the pilot, operating the control stick, tilts the auxiliary rotor in order to produce a force lifting the tail of the fuselage. This motion has an effect tending to bend the shaft 3 of the lifting rotor forward and the horizontal component of the thrust produced by the lifting rotor is used to carry the aircraft forward. When the planes of rotation of the auxiliary rotor are tilted, the thrust used to compensate the torque of the lifting rotor is diminished and the fuselage has a tendency to turn around the axis of the lifting rotor. To prevent this turning, the pilot has only to operate the control wheel in order to increase the rotating speed of the auxiliary rotors so that the torque will be exactly compensated.

In case of engine failure the free wheeling device enables the flywheels to keep rotating during a short period of time and to drive the lifting rotor and the auxiliary rotor so that the helicopter remains constantly controllable and a safe landing can be made.

It is thus seen that the present invention provides a simple, practical, efficient and reliable mechanism for controlling the maneuvers of a helicopter, and is well adapted to accomplish among others all the objects and advantages herein set forth.

Without further analysis the foregoing will so fully reveal the gist of this invention that others can, by applying current knowledge, readily adapt it for various applications without omitting certain features that, from the standpoint of the prior art, fairly constitute essential characteristics of the generic or specific aspects of the invention, and, therefore, such adaptations should and are intended to be comprehended within the meaning and range of equivalency of the following claims.

I claim:

1. In a flow controlled helicopter, in combination, a lifting rotor, a source of power therefor, said rotor having oppositely extending hollow blades with apertures on the top surface of each, a Venturi device at the tip of each blade and conduit means between each venturi and the slots of the opposite blade, whereby said venturi devices will compensate the asymmetrical action on the advancing and retreating sides of the rotor in forward flight.

2. In a flow controlled helicopter, in combination, a rotor, an engine to drive said rotor, a flywheel unit driven by said engine, means including a free wheeling device between the engine and the rotor adapted to utilize the kinetic energy stored in said flywheel as a prime mover in case of engine failure, and means under the control of the pilot for disconnecting the engine from the flywheel and changing the pitch of the blades.

3. In a flow controlled helicopter, in combination, a lifting rotor, an engine adapted to drive said rotor, the blades of said rotor being hollow and oppositely extending, each blade being divided by a partition to divide the same into two chambers extending longitudinally of the blades, one of said chambers in each blade being provided with apertures, a Venturi device at the end of each blade, unobstructed passageways between the chambers having the apertures communicating with one chamber of the opposite blade whereby said Venturi device will compensate the asymmetrical action on the advancing and retreating sides of the rotor in forward flight.

4. In a flow controlled helicopter, in combination, a lifting rotor, an engine adapted to drive said rotor, the blades of said rotor being hollow, a hollow hub for the rotor communicating with the hollow blades, a Venturi device associated with the tip of each of said blades and means including a partition hub in which partition is in alignment with the partitions in the blades, said blades having perforations at one side of the partition and connecting the Venturi device of one blade with the apertures in the top of the opposite blade, thereby to compensate the asymmetrical action of the advancing and retreating sides of the rotor in forward flight.

JEAN OLIVER DE CHAPPEDELAINE.